US011020886B2

(12) United States Patent
Siegl

(10) Patent No.: US 11,020,886 B2
(45) Date of Patent: Jun. 1, 2021

(54) METHOD FOR PRODUCING THIN-WALLED SMALL PLASTIC PARTS AND THIN-WALLED SMALL PLASTIC PARTS

(71) Applicant: ALPLA WERKE ALWIN LEHNER GMBH & CO. KG, Hard (AT)

(72) Inventor: Robert Siegl, Dornbirn (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 238 days.

(21) Appl. No.: 15/670,526

(22) Filed: Aug. 7, 2017

(65) Prior Publication Data

US 2017/0334108 A1 Nov. 23, 2017

Related U.S. Application Data

(63) Continuation of application No. PCT/EP2016/051129, filed on Jan. 20, 2016.

(30) Foreign Application Priority Data

Feb. 6, 2015 (CH) ........................................ 160/15

(51) Int. Cl.
- *B29D 22/00* (2006.01)
- *B29C 45/00* (2006.01)
- *C08G 63/181* (2006.01)
- *B29L 31/00* (2006.01)
- *B29K 67/00* (2006.01)

(52) U.S. Cl.
CPC ........ *B29C 45/0001* (2013.01); *C08G 63/181* (2013.01); *B29C 2045/0094* (2013.01); *B29C 2045/0096* (2013.01); *B29K 2067/04* (2013.01); *B29K 2995/006* (2013.01); *B29L 2031/712* (2013.01)

(58) Field of Classification Search
CPC .................................................. B29C 45/0001
See application file for complete search history.

(56) References Cited

U.S. PATENT DOCUMENTS

| | | | |
|---|---|---|---|
| 6,720,362 B1 * | 4/2004 | Park | B29C 44/5663 521/79 |
| 9,622,563 B2 | 4/2017 | Collias et al. | |
| 9,713,897 B2 | 7/2017 | Besson et al. | |
| 2009/0026198 A1 * | 1/2009 | Ichikawa | B29C 44/352 220/62.22 |
| 2013/0270212 A1 | 10/2013 | Collias et al. | |
| 2013/0270295 A1 | 10/2013 | Collias et al. | |
| 2014/0300035 A1 * | 10/2014 | Eberle | B29C 49/0073 264/529 |
| 2015/0064383 A1 * | 3/2015 | Kriegel | B29C 49/0005 428/36.92 |
| 2016/0113376 A1 | 4/2016 | Collias et al. | |
| 2016/0167279 A1 | 6/2016 | Besson et al. | |

FOREIGN PATENT DOCUMENTS

| | | |
|---|---|---|
| WO | WO 2013/158477 A1 | 10/2013 |
| WO | WO 2015/015243 A1 | 2/2015 |

OTHER PUBLICATIONS

International Search Report (PCT/ISA/210) dated Mar. 29, 2016, by the European Patent Office as the International Searching Authority for International Application No. PCT/EP2016/051129.

Written Opinion (PCT/ISA/237) dated Mar. 29, 2016, by the European Patent Office as the International Searching Authority for International Application No. PCT/EP2016/051129.

Gruter et al., Accelerating Research into Bio-Based FDCA-Polyesters by Using Small Scale Parallel Film Reactors, *Combinatorial Chemistry and High Throughput Screening*, Jan. 1, 2012, pp. 180-188, vol. 15, No. 2, Bentham Science Publishers, Netherlands. ISSN: 1386-2073, XP009170411.

Papageorgiou et al., Synthesis of poly(ethylene furandicarboxylate) polyester using monomers derived from renewable resources: thermal behavior comparison with PET and PEN, *Physical Chemistry Chemical Physics*, Jan. 2014, p. 7946-7958, vol. 16, No. 17. ISSN: 1463-9076, DOI: 10.1039/c4cp00518j.

* cited by examiner

Primary Examiner — Joseph A Miller, Jr.
(74) Attorney, Agent, or Firm — Buchanan Ingersoll & Rooney PC

(57) ABSTRACT

A method is disclosed for producing thin-walled small plastic parts having an average wall thickness of less than about 1.5 mm, wherein the small plastic parts are produced in a plastic injection-molding method from polyethylene furanoate (PEF) having a viscosity of, for example, 0.3 dl/g to 0.7 dl/g, for example, preferably less than e.g., 0.6 dl/g, measured according to a measurement method as per ASTM D4603, which polyethylene furanoate has an exemplary water content of less than 100 ppm in the plastic injection process.

8 Claims, No Drawings

METHOD FOR PRODUCING THIN-WALLED SMALL PLASTIC PARTS AND THIN-WALLED SMALL PLASTIC PARTS

RELATED APPLICATIONS

This application claims priority as a continuation application under 35 U.S.C. § 120 to PCT/EP2016/051129, which was filed as an International Application on Jan. 20, 2016 designating the U.S., and which claims priority to Swiss Application No. 160/15 filed in Switzerland on Feb. 6, 2015. The entire contents of these applications are hereby incorporated by reference in their entireties.

FIELD

The present disclosure relates to a method for producing thin-walled plastic parts, and to thin-walled small plastic parts.

BACKGROUND INFORMATION

In terms of this disclosure, small plastic parts refer to closures, for example for beverage containers, parts of containers, such as, e.g., tube shoulders, entire containers, such as, e.g., cartons, capsule-like containers and blister-like containers (pads) for coffee, cocoa, or tea, and the like. In terms of this disclosure, small plastic parts that have an average wall thickness of, for example, less than 1.5 mm are considered to be thin-walled.

Such thin-layer small plastic parts have been produced from bulk plastics, such as, for example, polyethylene (PE), polypropylene (PP), polyethylene terephthalate (PET), polystyrene (PS) or polyvinyl chloride (PVC). Since small plastic parts from these bulk plastics have only relatively poor barrier properties, particularly also because of their thin-walled property, with respect to oxygen, carbon dioxide, and water vapor, additional barrier layers have been provided in the production of small plastic parts from these materials, or the plastics are admixed with barrier additives before their processing to form the small plastic parts. As barrier layers, for example, ethylene-vinyl alcohol-copolymer (EVOH), polyglycolic acid (PGA) or polyamide are used. In many cases, coatings of the small plastic parts with plasma coatings, for example carbon coatings (DLC) or else thin titanium oxide, aluminum oxide or silicon oxide coatings, are also used in order to achieve the desired barrier properties.

The production of such thin-walled small plastic parts has been performed during thermoforming (deep-drawing) from a multi-layer film. The production of multi-layer films is relatively simple and widely available on the market. Thermoforming (deep-drawing) represents a known application, in particular for the production of packaging, for example, in the food industry, and has been quite well tested.

The use of multi-layer films or plates during thermoforming turns out to be adverse for recycling, however, since the multi-layer small plastic parts can be separated from the individual materials only with great difficulty, if at all. In the case of thermoforming, a stamping screen is often also required, but it can be fed into the recycling process only with difficulty or not at all. As a result, the desired obligatory recycling rates often cannot be achieved.

SUMMARY

A method is disclosed for producing a thin-walled small plastic part with an average wall thickness of less than 1.5 mm, comprising: injection-molding a small plastic part of polyethylene furanoate (PEF) with a viscosity of 0.4 dl/g to 0.7 dl/g, measured according to a measurement method in accordance with ASTM D4603, wherein the PEF during the injection molding has a water content of less than 100 ppm.

A thin-walled small plastic part is also disclosed with an average wall thickness of less than 1.5 mm, produced in an injection-molding method wherein the plastic part essentially consists of: polyethylene furanoate (PEF) with a viscosity of 0.4 dl/g to 0.7 dl/g, measured according to a measurement method in accordance with ASTM D4603, wherein the PEF during the injection molding has a water content of less than 100 ppm; and the PEF is made of one layer.

DETAILED DESCRIPTION

Exemplary embodiments as disclosed herein can address drawbacks of known the thin-walled small plastic parts. A method for producing such thin-walled small plastic parts is also provided, with which small plastic parts can be produced, which parts can be easily recycled after their use as directed.

A method is disclosed for producing thin-walled small plastic parts with an average wall thickness of, for example, less than 1.5 mm, in which the small plastic parts are produced in a plastic injection-molding method that includes (e.g., consists of) polyethylene furanoate (PEF) with a very low viscosity of about (e.g., ±10%) 0.4 dl/g to 0.7 dl/g, for example less than 0.6 dl/g, measured according to a measurement method analogously to ASTM D4603, which describes the test with PET materials, and which—during the plastic injection process—has a water content of less than 100 ppm. Ideally, the water content during the plastic injection process can, for example, be less than 30 ppm.

By using polyethylene furanoate (PEF) with a very low viscosity, the small plastic parts can be produced very economically in a plastic injection-molding method. In this case, the viscosity is determined according to a measurement method analogously to ASTM D4603. This standardized measurement method was developed specifically for determining the viscosity of PET, but can be applied in an analogous form to PEF. The measurement method for the viscosity of PEF is selected analogously to ASTM D4603, since no special standard for viscosity measurement yet exists for the material PEF.

The use of a very runny PEF as a starting material reduces its production costs, since a time-consuming and cost-intensive solid-state polymerization process (or polycondensation process) can be eliminated or the latter has to be performed only to a slight extent in order to reach the desired viscosity.

The use of a runny PEF in addition can have advantages during plastic injection molding. With the runny PEF, during plastic injection molding, long thin flow paths can be much more easily achieved without the danger that the PEF melt solidifies too early or that orientations of the molecule chains will develop in the PEF melts. This makes possible the production of very thin-walled and low-distortion contours in the plastic injection-molding method.

The low viscosity of the PEF used for the plastic injection-molding method also has a positive effect on the barrier properties of the PEF, since the runnier PEF with its relatively short molecule chains is significantly more mobile and as a result can be brought much more quickly to crystallization up to a desired degree of crystallization. For the barrier properties and also for the heat resistance of the injection-molded thin-walled small plastic parts, a higher degree of crystallization can be advantageous. In contrast, greater amorphousness of the small plastic part for low-temperature impact resistance can be advantageous. For example, amorphous PEF has 10 times better barrier properties in relation to oxygen than PET of comparable wall thickness. In comparison to PP, the barrier properties of amorphous PEF in relation to oxygen are even better by a factor of up to 300. Also, the barrier properties of PEF in relation to water vapor are better by the factor 2 in relation to PET of the same wall thickness. Therefore, amorphous PEF can have advantages in comparison to known plastics with respect to the retention of the aroma of decanted products. As a result, the thin-walled small plastic parts can be produced as one-layer structures.

The production of multi-layer films or plates for thermoforming is also not necessary, nor is a stamping screen that is used in many cases. For the plastic injection-molding method, even less plastic material needs to be heated and cooled again than for thermoreforming. As a result, the plastic injection-molding method, which is more complex per se, is an economical alternative to thermoforming (deep-drawing). The exemplary injection-molded small plastic parts that consist of one-layer PEF can be fed completely into the recycling process, which can have an advantageous effect on a targeted recycling rate.

The PEF that is processed in the plastic injection-molding method in this case has a water content of less than 100 ppm. The water content of the PEF that is processed in the plastic injection-molding method is for example, preferably less than 30 ppm. To this end, the PEF is dried before its processing. The setting of the viscosity and the water content of the PEF before its processing in the plastic injection-molding method provide for the retention of the molecular structure of the PEF and in particular its chain length. By the drying of the PEF, a hydrolytic degradation of the chains is reduced, and a chain cleavage of the PEF can be suppressed by hydrolysis during injection molding of the PEF. In this exemplary case, the preparation of the PEF should be carried out as close in time as possible to its further processing in the plastic injection-molding method. In terms of exemplary methods, in this case, a time period of for example, 0 to 2 hours is considered to be close in time. In this case, the PEF that is used for the production of the thin-walled small plastic parts in the plastic injection-molding method can have a linear chain structure or else can contain smaller or larger branches.

In a method variant, the PEF that is used for the plastic injection-molding method can contain, for example, 10% to 100% bio-based PEF. The use of bio-based PEF is desirable for ecological reasons, because exclusively renewable substances are used for the production of PEF.

In another exemplary method variant, the PEF that is used can contain up to 100% regenerated material. Because of the production method of the PEF and the temperatures used for the drying and further processing of the PEF, any minor contaminants play a subordinate role with other substances, for example with foreign polymers. Therefore, injection-molded small plastic parts, which contain regenerated material, can come into direct contact with the packaging material without limitations.

Another exemplary method variant can provide that the PEF is physically or chemically foamed until it has a degree of foaming of for example, 0% to 30%. The foaming of the PEF is carried out in this exemplary case inside the mold cavity of the injection-molding mold that is used.

Another exemplary method variant can provide for mixing with easily oxidizable additives, which can react off with oxygen with or without a catalyst and thus can keep oxygen away from the package contents. As a catalyst, for example, cobalt salts are suitable.

For setting the desired water content, the PEF can be dried at a drying temperature that is, for example, higher than 100° C. and lower than 200° C. The drying process is used to set the water content of PEF, and it makes it possible for the PEF material to be partially cleaned or the viscosity, if necessary, to be raised to the desired extent. The drying can be performed in a known dryer. It can, however, turn out to be advisable if, in the case of the drying, a stirring mechanism or a corresponding device is used to keep the PEF material from sticking. Depending on the initial moisture penetration of the PEF material, a drying time of, for example, between 3 and 30 hours is an exemplary goal to reach a moisture level of less than 100 ppm. In addition, energy can also still be introduced by infrared or microwave radiation in order to further shorten the drying time. The drying of the PEF can also be done in a vacuum or under an inert gas atmosphere, for example under nitrogen atmosphere, which does not enter into any reactions with PEF.

In another exemplary method variant, a portion of nucleating agents that does not exceed 5% can be added to the PEF. By adding nucleating agents, crystallization can be influenced in a directed manner. Nucleating agents can include, for example: calcium carbonate, clay powder, silicates, alkali salts, alkaline-earth salts, aluminum salts, titanium salts, organic salts (e.g., metal salts of polyesters), metal oxides, sorbitol derivatives, phosphate derivatives, talc, waxes, polyolefins (PE, TPE, PP), aliphatic polyamides.

In an alternative exemplary method variant, a portion of copolymers, for example diethylene glycol, which does not exceed 10%, can be added to the PEF to suppress crystallization of the PEF during the injection molding.

A thin-walled small plastic part that is produced according to exemplary embodiments in the plastic injection-molding method as disclosed has an average wall thickness of less than about 1.5 mm. In this exemplary case, the small plastic part consists essentially only of PEF formed in one layer. The one-layer design of the small plastic part that consists of PEF makes its complete recycling possible, which can be desirable in particular from the ecological standpoint.

In an exemplary variant, the injection-molded thin-walled small plastic part can have an average wall thickness that is less than about 1 mm. The low-viscosity PEF that is used is very runny and allows a very quick filling of the mold cavity of the injection-molding mold. Because of the very narrow mold clearance, a certain desired crystallization of the injected PEF melts can be achieved nevertheless.

An exemplary variant can provide that the thin-walled small plastic part has a degree of crystallization of up to about 50% at least in some places. A higher degree of crystallization has positive effects on the barrier properties while the amorphousness of the PEF can have an advantageous effect on low-temperature impact resistance.

In an exemplary variant, the injection-molding mold cannot be completely closed during injection of the PEF mass, and the latter is only completely closed during or after the injection of the PEF mass. With such process control, the thin-walled small plastic part is formed by an injection-molding process and an impact-extruding process. Depending on exactly when the mold is closed, the injection-molding process or the impact-extruding process predominates.

In another exemplary method variant, the thermoplastic PEF molding material can be introduced even before the mold in the mold cavity is closed. In this case, the production of small plastic parts is actually no longer an injection-molding process, but rather in this case, it is called an impact-extruding process.

The injection-molded thin-walled small plastic part according to the disclosure can, for example, be designed as a closure, for example for a beverage container, as a part of a container, for example as a tube shoulder, as an entire container, such as, e.g., as a carton, as a capsule-like container or a blister-like container (pad) for coffee, cocoa, or tea. It can be designed in particular as a container for oxygen-sensitive package contents. For example, the thin-walled small plastic part can be a foil dish or a carton for oxygen-sensitive package contents. As capsule-like or blister-like containers of coffee, cocoa or tea, the design of the injection-molded thin-walled small plastic part makes storage possible with very little loss of aroma. In this case, the closure film for the capsule-like packaging can also be manufactured from PEF, which can enormously improve the recyclability of such containers. A thin-walled small plastic part according to the disclosure can also be used for example, as a cup for baby food, for storing pesto, sauces, or ketchup.

The use of low-viscosity PEF makes possible an economical manufacturing of thin-walled small plastic parts in a plastic injection-molding method. The injection-molded small plastic parts that consist of PEF can be made in one layer without negative effects on their barrier properties. In this case, with respect to their barrier properties, they are at least equal to and, in many cases, better than those in thermoforming (deep-drawing) that consist of films or plates made from known bulk plastics, such as PE, PP, PET, PS or PVC, which are provided with barrier layers that consist of EVOH, PGA or PA, or else have coatings that consist of amorphous carbon layers or thin glass coatings. In contrast to the small plastic parts of the state of the art, which are based on multiple layers and several different materials, which parts can be fed into the recycling process only with difficulty and incompletely, exemplary thin-walled small plastic parts as disclosed herein are one-substance parts made of PEF and based on one layer and can be recycled very easily and completely.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An injection molding method for producing a thin-walled small plastic part, comprising:
    injection-molding the thin-walled small plastic part to have an average wall thickness of less than 1.5 mm, wherein the thin-walled small plastic part is formed from polyethylene furanoate (PEF) with a viscosity of 0.4 dl/g to 0.6 dl/g, measured according to a measurement method in accordance with ASTM D4603, and the PEF during the injection molding has a water content of less than 30 ppm.

2. The injection molding method according to claim 1, wherein the PEF comprises:
    10% to 100% bio-based PEF for the plastic injection-molding.

3. The injection molding method according to claim 1, comprising:
    drying the PEF at a drying temperature that is higher than 100° C. but lower than 200° C.

4. The injection molding method according to claim 3, comprising:
    stirring the PEF during the drying process.

5. The injection molding method according to claim 3, wherein the drying process of PEF is supported by a supply of microwave radiation.

6. The injection molding method according to claim 3, wherein the drying of PEF is done under vacuum or in an inert gas atmosphere.

7. The injection molding method according to claim 1, comprising:
    adding a portion of nucleating agents, which does not exceed 5% w/w, to the PEF.

8. The injection molding method according to claim 1, comprising:
    adding a portion of copolymers, which does not exceed 10% w/w, to the PEF.

* * * * *